Figure 6:
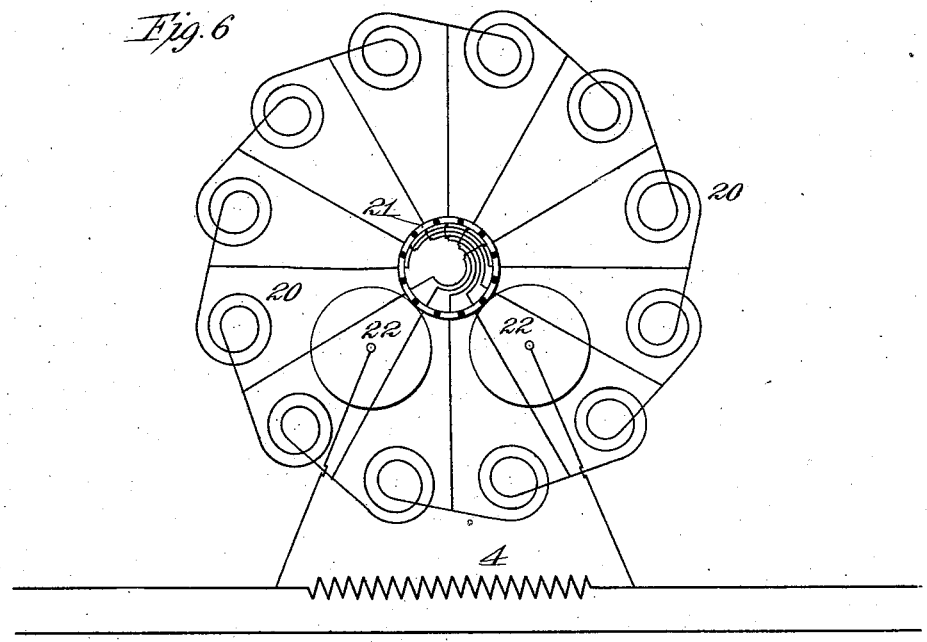

No. 685,314. Patented Oct. 29, 1901.
R. S. WHITE.
ELECTRICITY METER.
(Application filed Aug. 24, 1901.)
(No Model.) 3 Sheets—Sheet 1.
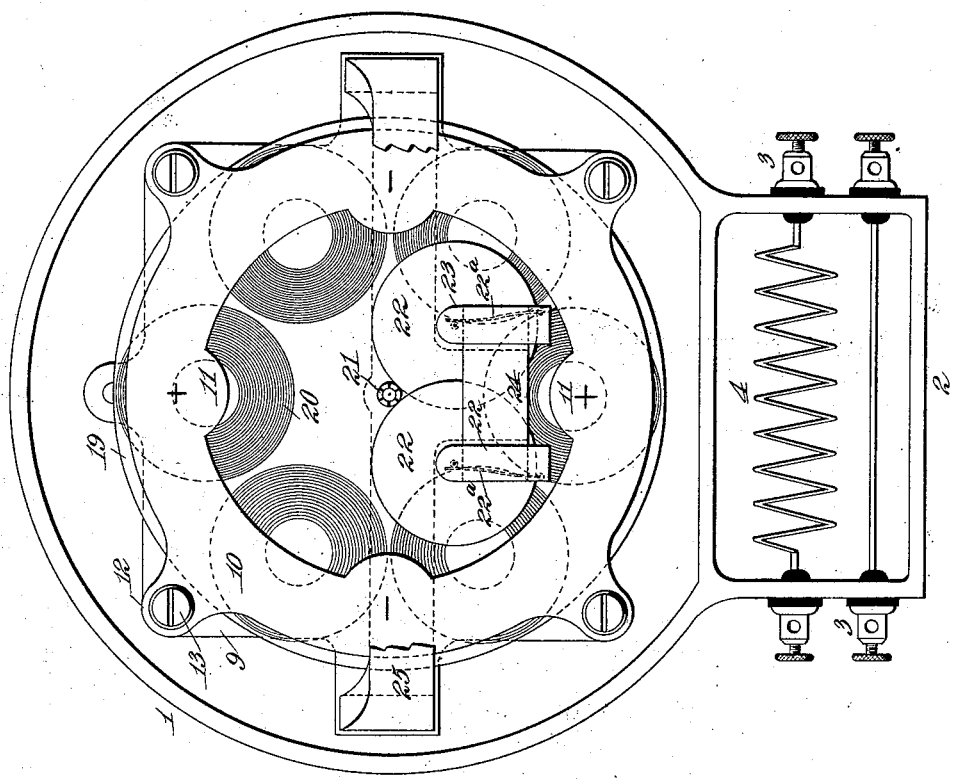
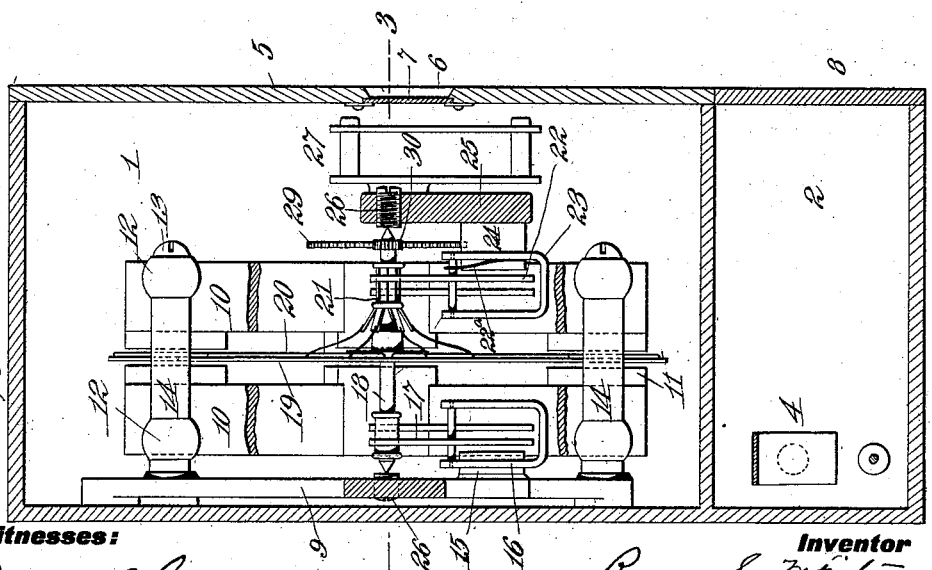
Witnesses: Inventor
Jas. H. Coleman Roger S. White
Jno. Robt. Taylor by Dyer Edmonds & Dyer
Attorneys No. 685,314. Patented Oct. 29, 1901.
R. S. WHITE.
ELECTRICITY METER.
(Application filed Aug. 24, 1901.)
(No Model.) 3 Sheets—Sheet 2.
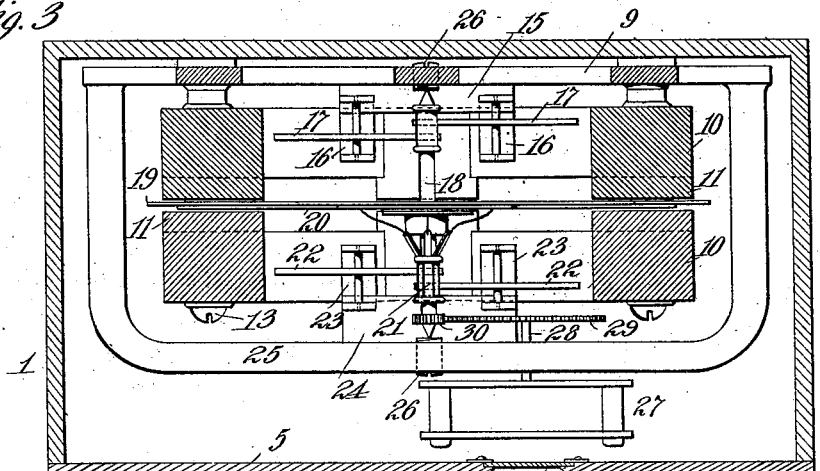
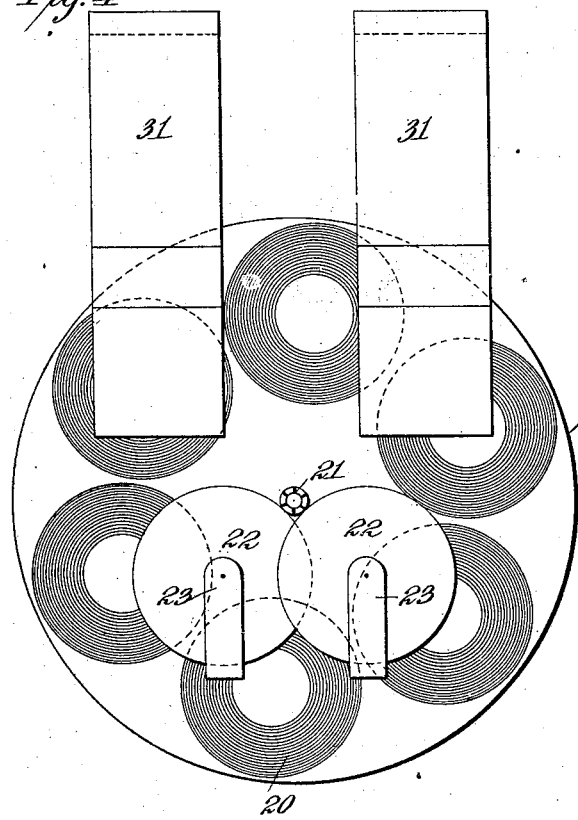
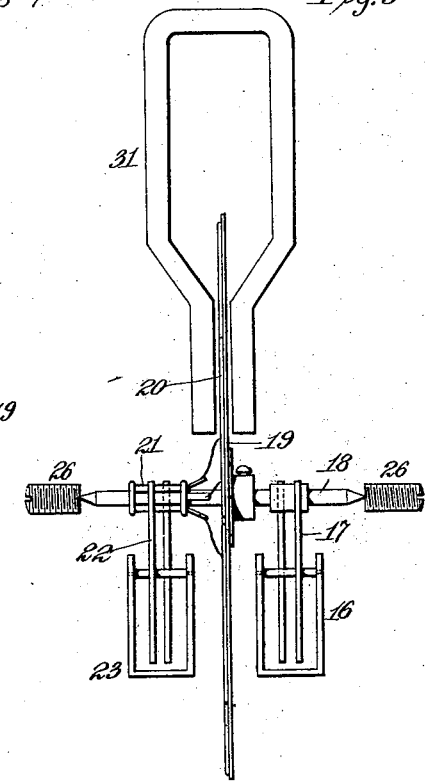
Witnesses:
Jas. F. Coleman
Jno Robt Taylor
Inventor
Roger S. White
by Dyer Edmond & Dyer
Attorneys No. 685,314. Patented Oct. 29, 1901.
R. S. WHITE.
ELECTRICITY METER.
(Application filed Aug. 24, 1901.)

(No Model.) 3 Sheets—Sheet 3.

UNITED STATES PATENT OFFICE.

ROGER SHERMAN WHITE, OF CHICAGO, ILLINOIS.

ELECTRICITY-METER.

SPECIFICATION forming part of Letters Patent No. 685,314, dated October 29, 1901.

Application filed August 24, 1901. Serial No. 73,137. (No model.)

*To all whom it may concern:*

Be it known that I, ROGER SHERMAN WHITE, a citizen of the United States, residing at Chicago, in the county of Cook and State of Illinois, have invented a certain new and useful Improvement in Electricity-Meters, of which the following is a description.

My invention relates to various new and useful improvements in electricity-meters of the type wherein the rotation of an armature influenced by the current to be measured actuates a suitable register. The improvements are applicable for use in connection with ampere-meters, wattmeters, or, in fact, any electrical instrument of precision employing a rotating armature influenced by the current or by a proportionate part of the current which requires to be measured.

My object is to provide an improved device for the purpose which shall be simple in construction and of high efficiency.

With electricity-meters and analogous electrical measuring apparatus as now constructed a horizontally-rotatable armature has ordinarily been employed, mounted on a vertical shaft, the latter being stepped at its lower end in a suitable jewel. The weight of the rotating parts which are carried on the sejewels in the present meters tends to wear out the jewels, necessitating expense in substituting new ones and bringing into the operation an element of varying friction, which detracts from the desirable accuracy of the measuring apparatus.

With my present meter I employ a vertically-mounted armature carried on a horizontal shaft, the latter being supported by roller-bearings of large size, whereby the shafts of such bearings will rotate very slowly, so that wear will be practically eliminated. Friction between the rotating armature-shaft and said roller-bearings is of course overcome, while the friction of the shafts of the bearings is greatly reduced, owing to the slow speed at which they rotate. The latter friction is, moreover, constant, since whatever wear there is between the shafts of the bearing-rollers and the slots or boxes which support the same effects at best only a minute wearing away of such slots or boxes simultaneously for all the bearing-rollers, so that the effect of wear is merely to permit the armature-shaft to descend a practically infinitesimal extent. This wear is, in fact, so extremely slight as to be negligible for all practical purposes.

With prior electricity-meters and analogous electrical measuring apparatus as now used for the metering or registration of continuous currents current is supplied to the rotating armature by means of collecting-brushes, which bear on the commutator or commutators, and the friction between such brushes and their coöperating rubbing-surfaces varies with the condition of the commutators and obviously increases as the brushes become worn and the area of contact thereof is enlarged. As a result of this retarding influence electrical measuring apparatus employing commutator-brushes are unreliable in their registration and become less accurate the longer they are used. Moreover, however delicately apparatus of this type may be made it is practically impossible to construct a rotating armature to start to rotate on the minimum current which it may be desired to measure—for example, the current necessary to supply a single night-lamp of low candle-power.

With my improved meter I do away entirely with brushes coöperating with the commutator and employ instead the roller-bearings referred to, which when the meter is employed for measuring direct currents act as current-collectors coöperating with the commutators. When my improved meter or other device is therefore used for the registration of direct currents, I employ a single commutator, with which a pair of antifriction disks or rollers coöperate, the armature being so wound with respect to the fields and the bearing-disks being so disposed as to engage the commutator at such points thereon that the lines of commutation in the armature will coincide with the fields or energizing-coils.

My invention also employs improvements in details of construction, all of which will be more fully hereinafter described and claimed, reference being had to the accompanying drawings, forming part of this specification, and in which—

Figure 1 is a vertical sectional view of a multipolar ampere-meter embodying my invention in its preferred form; Fig. 2, a front view of the same; Fig. 3, a section on the line 3 3 of Fig. 1; Fig. 4, a front view of a small bipolar meter, involving a simple winding on the armature; Fig. 5, a vertical section of the meter shown in Fig. 4; Fig. 6, a diagram of the meter shown in Figs. 1, 2, and 3, showing twelve coils; and Fig. 7, a diagram of the meter shown in Figs. 4 and 5.

In all of the above views corresponding parts are represented by the same numerals of reference.

Referring first to Figs. 1, 2, and 3, 1 represents a generally cylindrical casing, cast with a box 2 at its lower end, the latter being provided with binding-posts 3 3 for properly connecting the meter with the line, and containing also a resistance 4 of suitable material for permitting the desired portion of the load to be deflected through the motor-armature. By means of this construction the casing 1 may be provided with a cover 5, sealed in place and having a sight-opening 6 therein, with a glass 7 behind it. My improved meter being unprovided with brushes or jewels and requiring therefore no attention in use, the cover 5 need not be removed. The box 2 is provided with a cover 8, which may be screwed in place and which may be removed by the lineman in making the connections between the meter and the line. The casing 1 carries a suitable base 9, to which are secured two essentially ring-shaped permanent magnets 10 10, having poles 11 11. As shown, each magnet is provided with four poles of alternate polarity. Preferably the magnets 10 are cast of chrome-steel. The magnets are formed with lugs 12, through which pass the securing-screws 13, and the magnets are separated by sleeves 14, made, preferably, of brass and which surround said screws. Secured to the plate 9 is a block 15, which carries two yokes 16 16, forming bearings for the reduced ends of the shafts of antifriction-disks 17. These disks are sufficiently separated to properly support the armature-shaft 18 at its rear end. This armature-shaft carries an armature formed, preferably, of a copper disk 19, having flat coils 20 thereon, and connecting with said coils are the segments of a commutator 21. Preferably the shaft 18 at the rear of the armature is of the same diameter as the commutator 21, as shown, so that all the bearing-disks will rotate in unison. The commutator 21 is supported on bearing-disks 22, the shafts of which are carried in yokes 23, which are secured to insulating-blocks 24, the latter being carried by a yoke 25, which extends around the magnets 10 10, (see Fig. 3,) being preferably cast integrally with the back-plate 9. Pressing against the shaft of each of the bearing-disks 22 is a fine silver wire 22ª, which is carried from the insulating-block 24 and by means of which current will be conducted to and from the commutator. In order to limit longitudinal movement of the armature-shaft 18, I make use of limiting-screws 26, which are adjusted in close proximity with the coned ends of the armature-shaft. The armature will obviously be seated on the bearing-disks 17 and 22 by its weight and is prevented from being dislodged during transportation by the sleeves 14. Carried by the yoke 25 is a register 27 of any suitable and approved type. The driving-shaft 28 of this register extends through the yoke and carries a spur-gear 29, which is engaged by and driven from a pinion 30 on the armature-shaft.

Referring to Fig. 6, it will be observed that the flat coils 20 are connected with the segments of the commutator, as in a Gramme ring, but that opposite segments of said commutator are connected together, as shown, so that by engaging the bearing-disks 22 with the commutator at points ninety degrees apart the lines of commutation will correctly coincide with the four poles of each of the magnets 10. It will be understood, of course, that where the poles are differently arranged the arrangement of the bearing-disks with the commutator should be changed to correspond, so that said bearing-disks will engage the commutator at points of different potential in order to secure lines of commutation which shall correspond with the poles. In order that the surfaces of the commutator and of the bearing-disks 22 may be always kept bright and free from oxidation, the commutator and said disks are made, preferably, of pure silver or other slowly-oxidizable metal or of some suitable metal carefully plated therewith. It is not so necessary that the bearing-disks 17 should be so carefully constructed, although in practice I find it desirable to make all the disks of pure silver.

Figure 7:
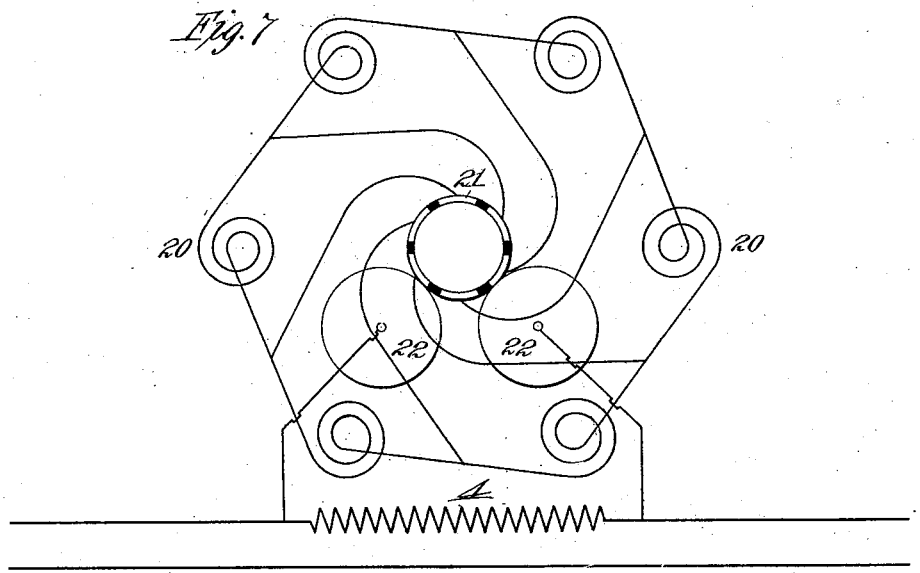

In Figs. 4 and 5 I show a modified arrangement of meter of the bipolar type employing two permanent horseshoe-magnets 31 and which coöperate with the armature at points substantially ninety degrees apart. By connecting the coils as shown in Fig. 7 the lines of commutation secured by the bearing-disks 22 will correspond with the poles of said magnets. In other respects the form of meter shown in Figs. 4 and 5 may correspond with that previously explained.

If it is desired to employ the meter in connection with a three-wire system, it will be obvious that the ordinary expedient may be resorted to of providing the armature with two sets of windings and with two commutators, one winding being connected around a shunt in one of the outside mains and the other winding being connected around a shunt in the other outside main.

Having now described my invention, what I claim as new, and desire to secure by Letters Patent, is as follows:

1. In an improved electrical measuring device, the combination with a rotatable armature and its commutator, of a pair of bearing-disks insulated from each other and with which the commutator engages to support the armature, said disks engaging the commutator at points of different potential, substantially as set forth.

2. In an improved electrical measuring device, the combination with a rotatable armature, a shaft for supporting the same, and a commutator carried by the shaft and connected with the armature-coils, of two pairs of bearing-disks for supporting the armature-shaft at either side of the armature, one pair of said disks engaging the commutator at points of different potential, substantially as set forth.

3. In an electricity-meter, the combination with a field-magnet, an armature rotatable with respect to the same, a shaft carrying the armature, and a commutator on the shaft connected with the armature-winding, of two pairs of bearing-disks supporting the armature-shaft on either side of said armature, one pair of said disks engaging the commutator at points of different potential, substantially as set forth.

4. In an electricity-meter, the combination with a multipolar field, an armature rotatable with respect to said field, a shaft carrying the armature, and a commutator on said shaft connected with the armature-winding, of two pairs of bearing-disks supporting the armature-shaft on either side of said armature, one pair of said disks engaging the commutator at points of different potential, and connections between opposite commutator-segments, substantially as set forth.

5. In an electricity-meter, the combination with two circular field-magnets having opposing poles, of a disk-armature mounted within said magnets and rotating between the poles thereof, two pairs of bearing-disks for supporting said armature, and a commutator carried on the armature-shaft and with which one pair of said disks engages at different points of potential, substantially as set forth.

6. In an electricity-meter, the combination with two circular field-magnets having opposing poles, of a disk-armature mounted within said magnets and rotating between the poles thereof, two pairs of bearing-disks for supporting said armature, a commutator carried on the armature-shaft and with which one pair of said disks engages at different points of potential, and connections between opposite segments of said commutator, substantially as set forth.

7. In an improved electrical measuring device, the combination with an armature rotatable in a vertical plane, a horizontal shaft carrying the armature, and a commutator on said shaft connected with the armature-winding, of a pair of supporting-yokes insulated from each other, and a bearing-disk mounted in each of said yokes and engaging the commutator at points of different potential so as to support said commutator, substantially as set forth.

This specification signed and witnessed this 5th day of August, 1901.

ROGER SHERMAN WHITE.

Witnesses:
FRANK L. DYER,
JNO. ROBT. TAYLOR.